United States Patent
Uenaka

(10) Patent No.: US 7,502,051 B2
(45) Date of Patent: *Mar. 10, 2009

(54) ANTI-SHAKE APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 760 days.

This patent is subject to a terminal disclaimer.

(21) Appl. No.: 11/071,241

(22) Filed: Mar. 4, 2005

(65) Prior Publication Data

US 2005/0195288 A1    Sep. 8, 2005

(30) Foreign Application Priority Data

Mar. 8, 2004    (JP)    ............ P2004-063970

(51) Int. Cl.
   *H04N 5/228* (2006.01)

(52) U.S. Cl. ............ 348/208.99; 348/208.11; 348/208.5; 348/208.13; 359/554; 359/555; 359/556; 359/557

(58) Field of Classification Search ............ 348/208.99, 348/52, 55, 208.7, 208.8, 208.11; 359/554, 359/555, 556, 557

See application file for complete search history.

(56) References Cited

U.S. PATENT DOCUMENTS

| | | | | | |
|---|---|---|---|---|---|
| 5,266,988 | A | * | 11/1993 | Washisu | 396/55 |
| 5,479,236 | A | * | 12/1995 | Tanaka | 396/55 |
| 5,932,984 | A | * | 8/1999 | Murakami et al. | 318/560 |
| 5,974,269 | A | | 10/1999 | Sato et al. | |
| 6,108,118 | A | * | 8/2000 | Minamoto | 359/224 |
| 6,112,028 | A | * | 8/2000 | Okada | 396/55 |
| 6,603,927 | B2 | * | 8/2003 | Enomoto | 396/55 |
| 6,631,042 | B2 | * | 10/2003 | Noguchi | 359/823 |
| 6,985,176 | B2 | * | 1/2006 | Noguchi | 348/208.11 |
| 7,292,270 | B2 | * | 11/2007 | Higurashi et al. | 348/208.3 |
| 2003/0067544 | A1 | | 4/2003 | Wada | |

FOREIGN PATENT DOCUMENTS

JP    10-142647    5/1998

(Continued)

OTHER PUBLICATIONS

English Language Abstract of JP 2002-229090.

(Continued)

*Primary Examiner*—Ngoc-Yen T Vu
*Assistant Examiner*—Quang V Le
(74) *Attorney, Agent, or Firm*—Greenblum & Bernstein, P.L.C.

(57) ABSTRACT

An anti-shake apparatus of a photographing apparatus comprises a movable unit and a fixed unit. The movable unit has an imaging device and is movable in first and second directions. The fixed unit slidably supports the movable unit in both the first and second directions. The movable unit has a hall-element unit. The magnetic-field change-detecting unit has a horizontal hall-element which is used for detecting a position of the movable unit in the first direction as a first location, and a vertical hall-element which is used for detecting a position of the movable unit in the second direction as a second location. Application of voltage to input terminals of the horizontal hall-element and the vertical hall-element is performed during a position detecting operation of the movable unit, and is stopped at a time other than that for the position detecting operation.

9 Claims, 7 Drawing Sheets

FOREIGN PATENT DOCUMENTS

| | | |
|---|---|---|
| JP | 2002-229090 | 8/2002 |
| JP | 2003-110919 | 4/2003 |

OTHER PUBLICATIONS

English Language Abstract of JP 2003-110919.
U.S. Appl. No. 11/044,055 to Uenaka et al., filed Jan. 28, 2005.
U.S. Appl. No. 11/044,054 to Uenaka, filed Jan. 28, 2005.
U.S. Appl. No. 11/044,010 to Uenaka et al., filed Jan. 28, 2005.
U.S. Appl. No. 11/065,354 to Uenaka et al., filed Feb. 25, 2005.
U.S. Appl. No. 11/073,638 tp Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/065,577 to Uenaka, filed Feb. 25, 2005.
U.S. Appl. No. 11/071,242 to Uenaka, filed Mar. 4, 2005.
U.S. Appl. No. 11/078,367 to Seo, filed Mar. 14, 2005.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, an application of voltage to input terminals of the hall element is performed during the position detecting operation of the movable unit and at a time other than that for the position detecting operation. This application of voltage to the input terminals of the hall element at a time other than that for the position detecting operation, is an unnecessary consumption of electric power.

SUMMARY OF THE INVENTION

Therefore, an object of the present invention is to provide an apparatus which can perform a position detecting operation with a low consumption of electric power, in an anti-shake apparatus.

According to the present invention, an anti-shake apparatus of a photographing apparatus comprises a movable unit and a fixed unit.

The movable unit has one of an imaging device and a hand-shake correcting lens, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions.

One of the movable unit and the fixed unit has a magnetic-field change-detecting unit.

The magnetic-field change-detecting unit has a horizontal magnetic-field change-detecting element which is used for detecting a position of the movable unit in the first direction, as a first location, and a vertical magnetic-field change-detecting element which is used for detecting a position of the movable unit in the second direction, as a second location.

Application of voltage to input terminals of the horizontal magnetic-field change-detecting element and the vertical magnetic-field change-detecting element is performed during a position detecting operation of the movable unit, and is stopped at a time other than that for the position detecting operation.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
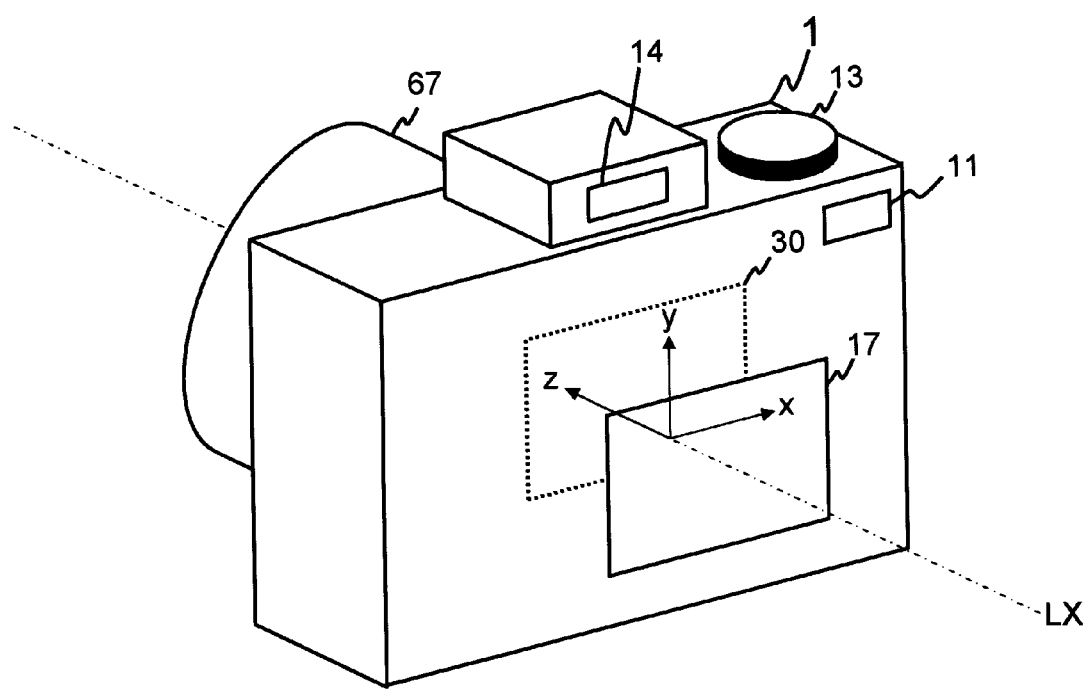
FIG. 1 is a perspective view of a photographing apparatus of the embodiment viewed from the back side of the photographing apparatus.

The present invention is described below with reference to the embodiment shown in the drawings. In this embodiment, the photographing device 1 is a digital camera. The photographing device 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
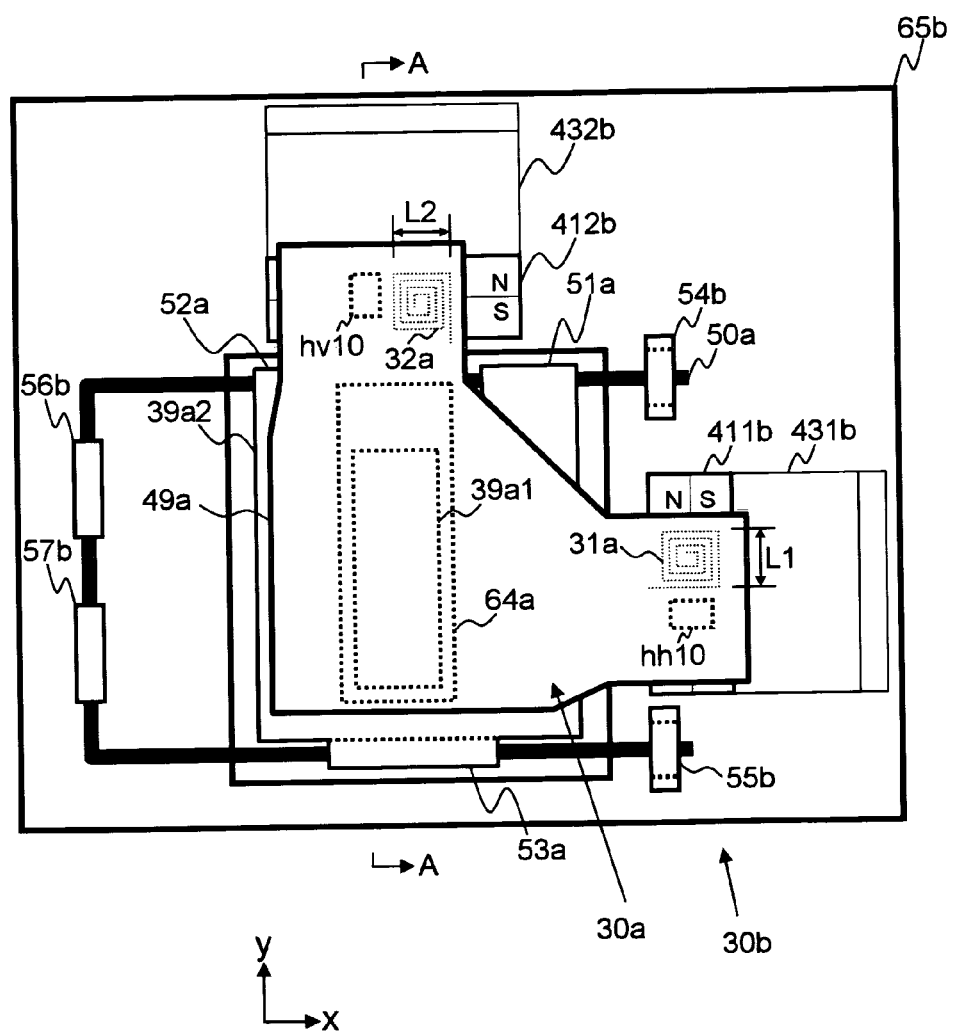
FIG. 4 is a figure showing the construction of the anti-shake unit.
Figure 5:
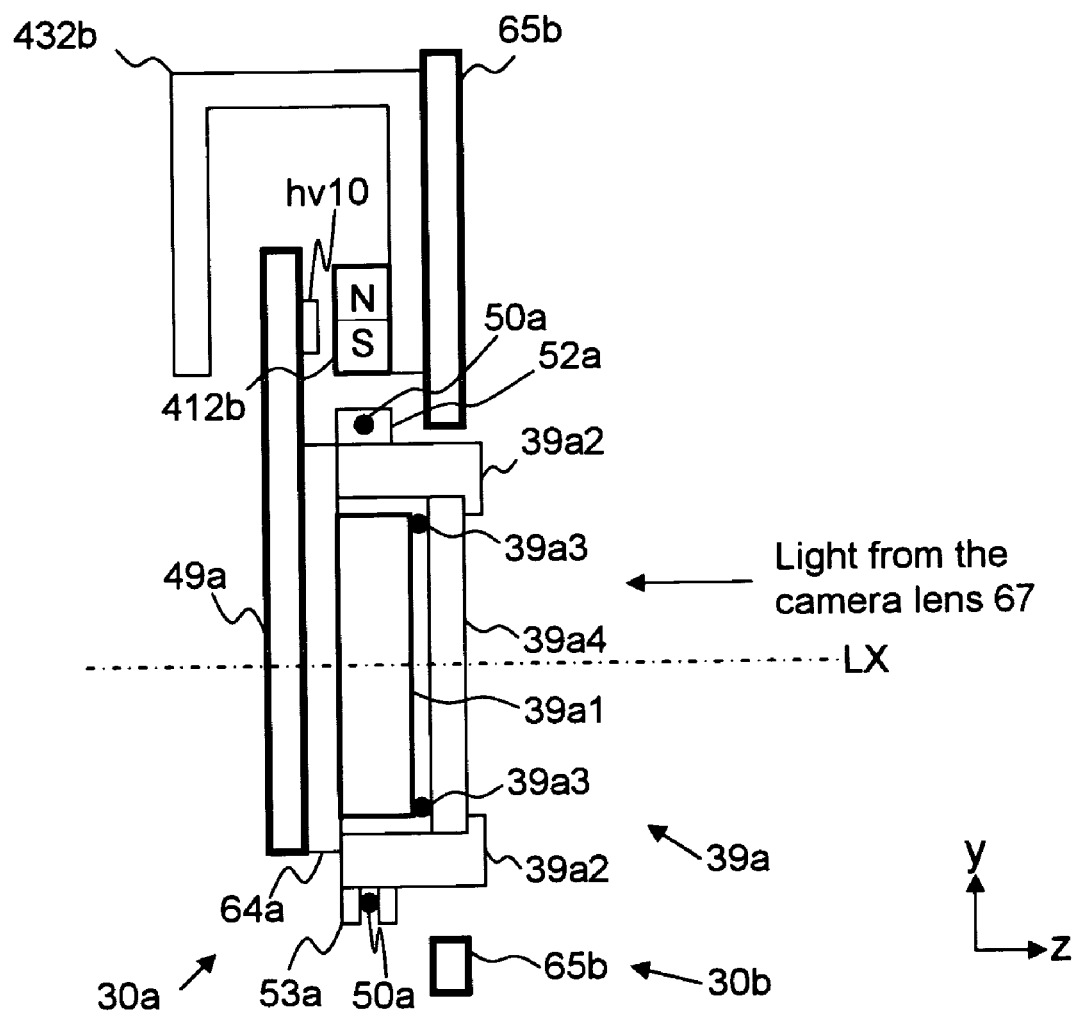
FIG. 5 is a view along line A-A of FIG. 4.

FIG. 5 shows a construction diagram of the section along line A-A of FIG. 4.

Figure 2:
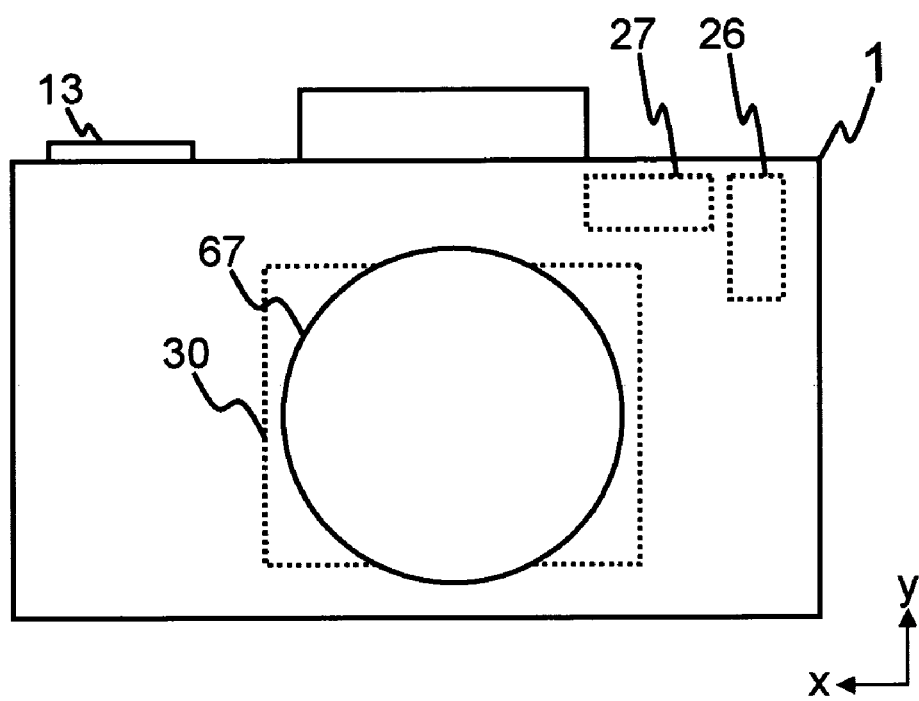
FIG. 2 is a front view of the photographing apparatus.
Figure 3:
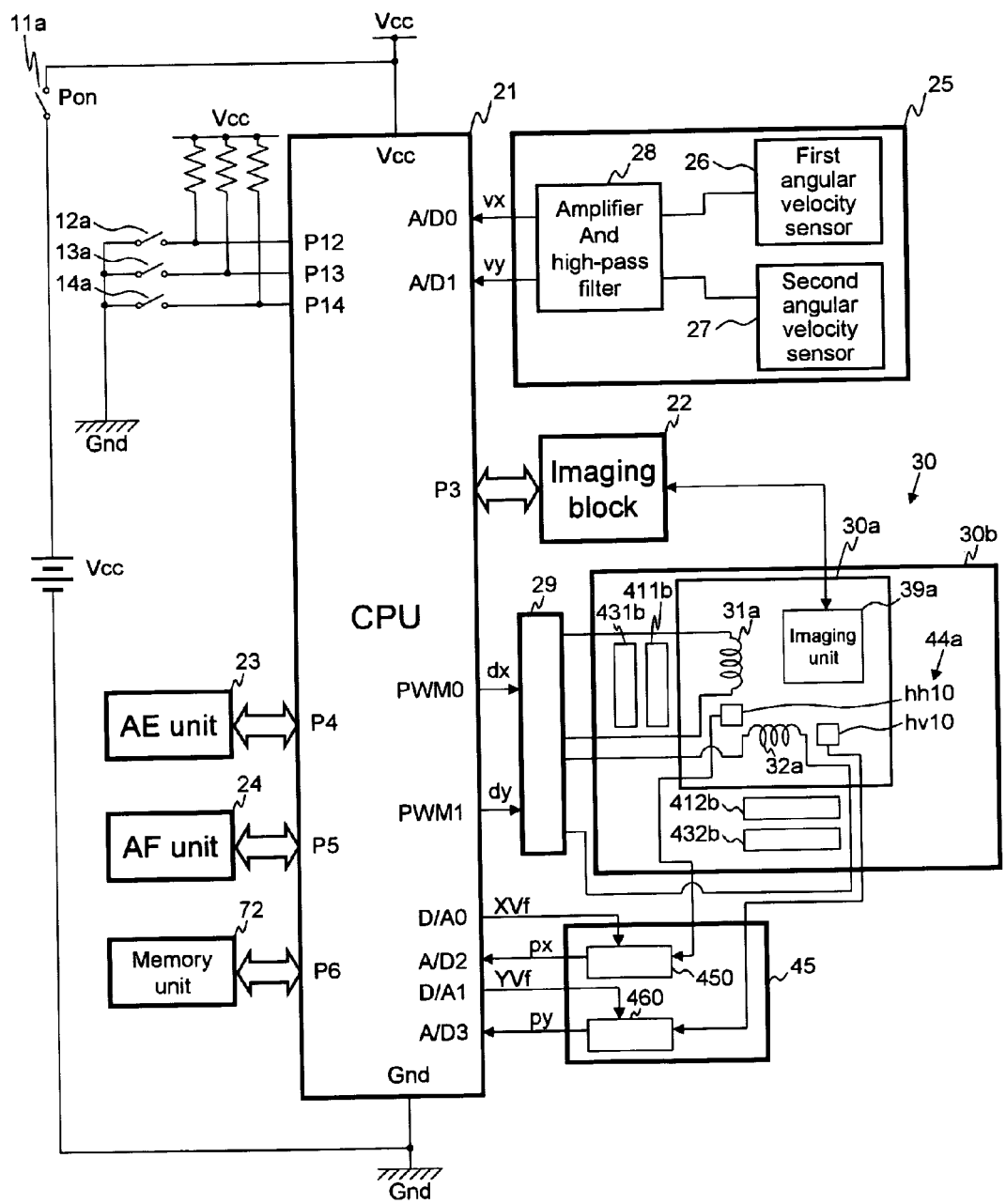
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an indicating unit 17 such as an LCD monitor etc., a CPU 21, an imaging block 22, an AE (automatic exposure) unit 23, an AF (automatic focusing) unit 24, an imaging unit 39a in the anti-shake unit 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, the camera lens 67, and the memory unit 72.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The memory unit 72 is a non-volatile memory, such as an EEPROM etc., which stores the value of a first voltage XVf which is applied to the input terminals of the horizontal hall element hh10, and the value of a second voltage YVf which is applied to the input terminals of the vertical hall element hv10. The memory unit 72 is electrically rewritable, so that a content which is stored in the memory unit 72 is not deleted even if the memory unit 72 is set to the off state. The memory unit 72 is connected to port P6 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y.

The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electromagnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30a, either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The fixed unit 30b has a position-detecting magnet unit, a first position-detecting and driving yoke 431b, a second position-detecting and driving yoke 432b, a first bearing unit for vertical movement 54b, a second bearing unit for vertical movement 55b, a third bearing unit for vertical movement 56b, a fourth bearing unit for vertical movement 57b, and a base board 65b. The position-detecting magnet unit has a first position-detecting and driving magnet 411b and a second position-detecting and driving magnet 412b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In this embodiment, the center of the imaging device 39a1 is the crossing point of these two diagonal lines.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 44a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by the first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first position-detecting and driving magnet 411b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by the second electro-magnetic force. The lines which are parallel to the first direction x, are used for moving the movable unit 30a in the second direction y. The lines which are parallel to the first direction x, have a second effective length L2.

The second electromagnetic force occurs on the basis of the current direction of the second driving coil 32a and the magnetic-field direction of the second position-detecting and driving magnet 412b.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 30b, on the side of the movable unit 30a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 30a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 30b, on the side of the movable unit 30a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 30a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 49a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 49a) raises the magnetic-flux density between the second position-detecting and driving magnet 412b and the second driving coil 32a, and between the second position-detecting and driving magnet 412b and the vertical hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 4).

The horizontal hall element hh10 is attached to the movable circuit board 49a of the movable unit 30a, under the condition where the horizontal hall element hh10 faces the first position-detecting and driving magnet 411b of the fixed unit 30b, in the third direction z.

The vertical hall element hv10 is attached to the movable circuit board 49a of the movable unit 30a, under the condition where the vertical hall element hv10 faces the second position-detecting and driving magnet 412b of the fixed unit 30b, in the third direction z.

When the center of the imaging device 39a1, passes through the optical axis LX, it is desirable that the horizontal hall element hh10 is located at a place on the hall element unit 44a which faces an intermediate area between the N pole and S pole of the first position-detecting and driving magnet 411b in the first direction x, viewed from the third direction z, to perform the position-detecting operation utilizing the full size of the range where an accurate position-detecting operation can be performed based on the linear output-change (linearity) of the one-axis hall element.

Similarly, when the center of the imaging device 39a1, passes through the optical axis LX, it is desirable that the vertical hall element hv10 is located at a place on the hall element unit 44a which faces an intermediate area between the N pole and S pole of the second position-detecting and driving magnet 412b in the second direction y, viewed from the third direction z.

The base board 65b is a plate state member which becomes the base for attaching the first position-detecting and driving yoke 431b etc., and is arranged being parallel to the imaging surface of the imaging device 39a1.

In this embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the hall element unit 44a are arranged on the opposite side of the movable circuit board 49a to the camera lens 67, so that the first and second position-detecting and driving magnets 411b and 412b are arranged on the same side of the base board 65b as the camera lens 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

The first voltage XVf is applied to the input terminals of the horizontal hall element hh1 through the circuit 456 of the first hall-element signal-processing circuit 450, from the D/A converter D/A 0 of the CPU 21 (controlled by the CPU 21), during the position detecting operation.

The second voltage YVf is applied to the input terminals of the vertical hall element hv10 through the circuit 466 of the second hall-element signal-processing circuit 460, from the D/A converter D/A 1 of the CPU 21 (controlled by the CPU 21), during the position detecting operation.

At a time other than that for the position detecting operation, the D/A converters D/A 0 and D/A 1 do not output signals, in other words, a voltage is not applied to the input terminals of the horizontal hall element hh10 and the vertical hall element hv10.

Figure 6:
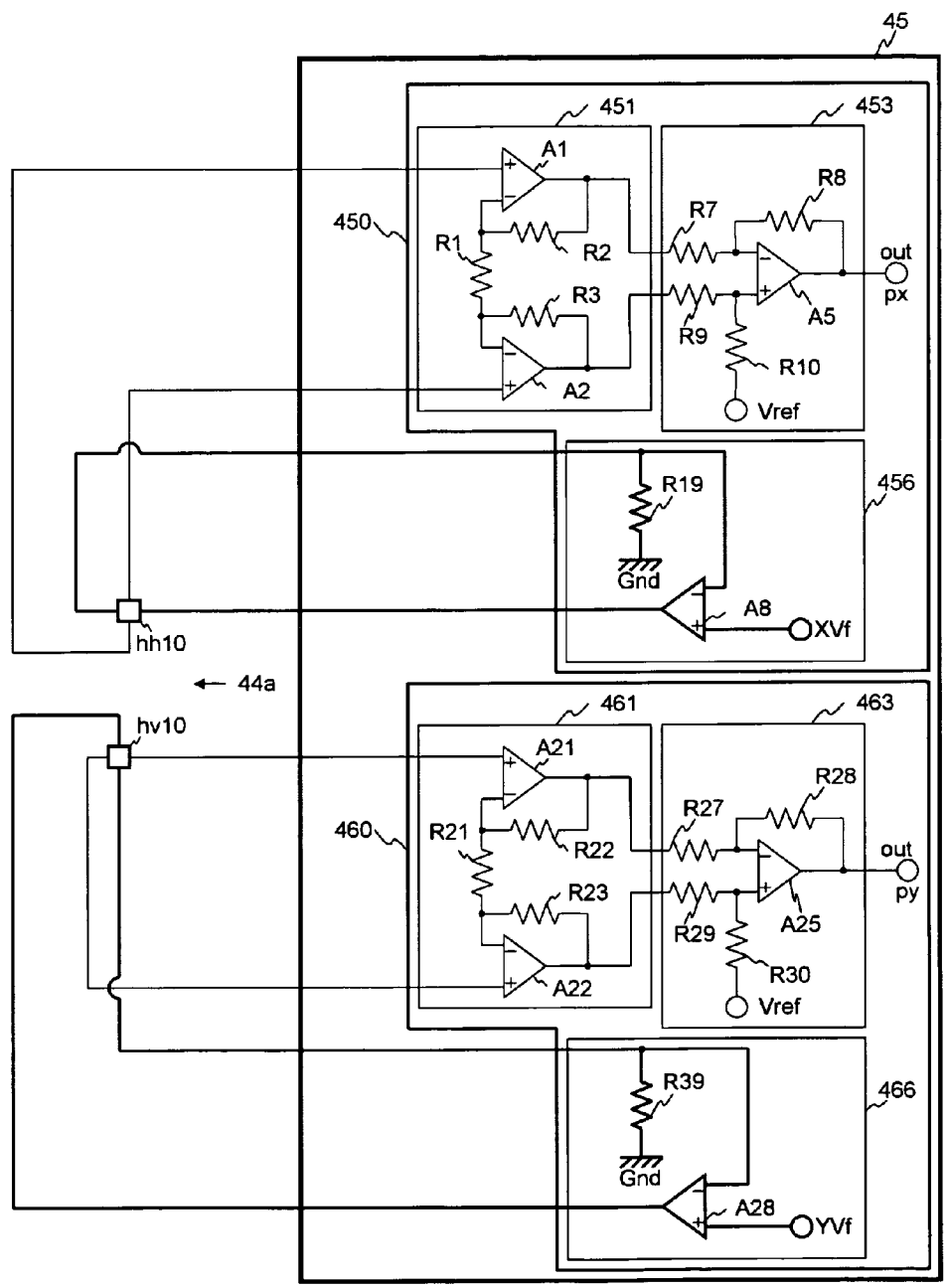
FIG. 6 is a circuit construction diagram of the circuit the hall element unit and the hall-element signal-processing unit.

The circuit construction regarding input/output signals of the horizontal hall element hh10, in the first hall-element signal-processing circuit 450 of the hall-element signal-processing circuit 45, and the circuit construction regarding input/output signals of the vertical hall element hv10, in the second hall-element signal-processing circuit 460 of the hall-element signal-processing circuit 45 are explained using FIG. 6.

The first hall-element signal-processing circuit 450 has a circuit 451 and a circuit 453 for controlling the output of the horizontal hall element hh10, and has a circuit 456 for controlling the input of the horizontal hall element hh10.

The second hall-element signal-processing circuit 460 has a circuit 461 and a circuit 463 for controlling the output of the vertical hall element hv10, and has a circuit 466 for controlling the input of the vertical hall element hv10.

Both output terminals of the horizontal hall element hh10 are connected with the circuit 451, so that the circuit 451 is connected with the circuit 453.

The circuit 451 is a differential amplifier circuit which amplifies the signal difference between the output terminals of the horizontal hall element hh10.

The circuit 453 is a subtracting amplifier circuit which calculates the horizontal potential-difference x10 (the hall output voltage) on the basis of the difference between the amplified signal difference from the circuit 451 and a reference voltage Vref, and which calculates the first detected-position signal px by multiplying a predetermined amplification rate by the horizontal potential-difference x10.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the horizontal hall element hh10 is connected with the non-inverting input terminal of the operational amplifier A1, so that the other terminal of the horizontal hall element hh10 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8. The first detected-position signal px, which is obtained by multiplying the predetermined amplification rate, by the horizontal potential-difference x10, is output from the output terminal of the operational amplifier A5. One of the terminals of the resistor R10 is connected with the power supply whose voltage is the reference voltage Vref.

The values of the resistors R2 and R3 are the same. The values of the resistors R7 and R9 are the same. The values of the resistors R8 and R10 are the same.

This predetermined amplification rate is based on the values of the resistors R7~R10 (the ratio of the value of the resistor R7 to the value of the resistor R8).

The operational amplifiers A1 and A2 are the same type of amplifier.

The circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the horizontal hall element hh10. The potential of the non-inverting input terminal of the operational amplifier A8 is set at the first voltage XVf corresponding to the value of the current that flows through the input terminals of the horizontal hall element hh10. The output terminal of the operational amplifier A8 is connected with the other input terminal of the horizontal hall element hh10. One of the terminals of the resistor R19 is grounded.

Both output terminals of the vertical hall element hv10 are connected with the circuit 461, so that the circuit 461 is connected with the circuit 463.

The circuit 461 is a differential amplifier circuit which amplifies the signal difference between the output terminals of the vertical hall element hv10.

The circuit 463 is a subtracting amplifier circuit which calculates the vertical potential-difference y10 (the hall output voltage) on the basis of the difference between the amplified signal difference from the circuit 461 and a reference voltage Vref, and which calculates the second detected-position signal py by multiplying a predetermined amplification rate by the vertical potential-difference y10.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the vertical hall element hv10 is connected with the non-inverting input terminal of the operational amplifier A21, so that the other terminal of the vertical hall element hv10 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28. The second detected-position signal py, which is obtained by multiplying the predetermined amplification rate, by the vertical potential-difference y10, is output from the output terminal of the operational amplifier A25. One of the terminals of the resistor R30 is connected with the power supply whose voltage is the reference voltage Vref.

The values of the resistors R22 and R23 are the same. The values of the resistors R27 and R29 are the same. The values of the resistors R28 and R30 are the same.

This predetermined amplification rate is based on the values of the resistors R27~R30 (the ratio of the value of the resistor R27 to the value of the resistor R28).

The operational amplifiers A21 and A22 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the vertical hall element hv10. The potential of the non-inverting input terminal of the operational amplifier A28 is set at the second voltage YVf corresponding to the value of the current that flows through the input terminals of the vertical hall element hv10. The output terminal of the operational amplifier A28 is connected with the other input terminal of the vertical hall element hv10. One of the terminals of the resistor R39 is grounded.

During the position detecting operation, voltage is applied to all operational amplifiers in the first and second hall-element signal-processing circuits 450 and 460 from both D/A converters D/A 0 and D/A 1 of the CPU 21. At a time other than that for the position detecting operation, the voltage is not applied to the operational amplifiers in the first and second hall-element signal-processing circuits 450 and 460 from both D/A converters D/A 0 and D/A 1 of the CPU 21.

In order to maintain a stable waiting time for each operational amplifier, when the position detecting operation is started, the application of voltage to all operational amplifiers in the first and second hall-element signal-processing circuits 450 and 460 is performed before the application of the first voltage XVf to the input terminals of the horizontal hall element hh10, and the second voltage YVf to the input terminals of the vertical hall element hv10.

Further, when the position detecting operation is finished, the application of voltage to all operational amplifiers in the first and second hall-element signal-processing circuits 450 and 460, the application of the first voltage XVf to the input terminals of the horizontal hall element hh10, and the application of the second voltage YVf to the input terminals of the vertical hall element hv10, is stopped at the same time.

In the case where the application of voltage to the input terminals of the horizontal hall element hh10 and the vertical hall element hv10 is performed directly from the power supply etc. (not through the CPU 21), the application of voltage is always performed evenly if the position detecting operation is not performed, while the Pon button 11 is set to the on state (power of state of the photographing apparatus 1).

The application of voltage to the input terminals of the horizontal hall element hh10 and the vertical hall element hv10, at a time other than that for the position detecting operation, is an unnecessary of electric power.

In this embodiment, the application of voltage to the input terminals of the horizontal hall element hh10 and the vertical hall element hv10, is performed only during the position detecting operation, controlled by the CPU 21. Therefore, the consumption of electric power can be restrained.

Similarly, the application of voltage to the operational amplifiers is performed only during the position detecting operation, in this embodiment. Therefore, the consumption of electric power can be further restrained, in comparison with when the application of voltage to the operational amplifiers is always performed while the photographing apparatus 1 is in the on state.

Figure 7:
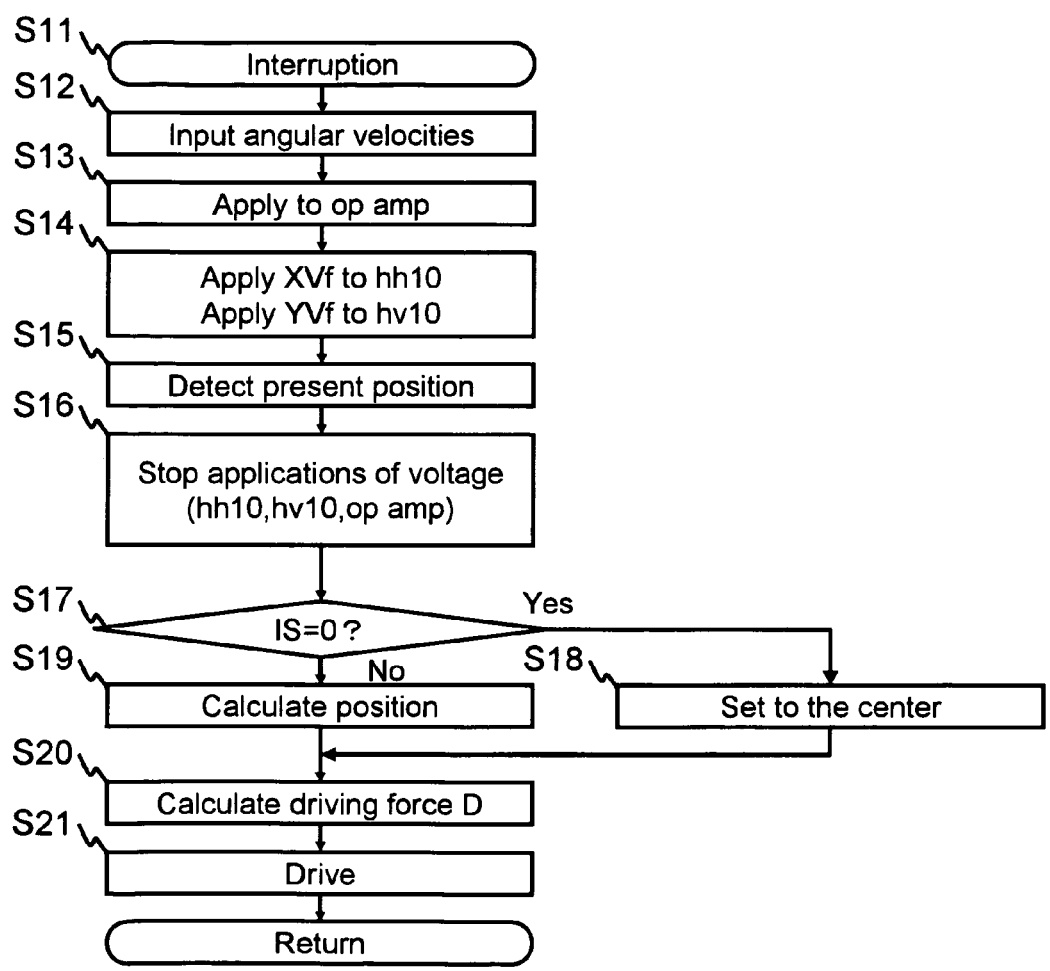
FIG. 7 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 7.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the application of voltage to all operational amplifiers in the first and second hall-element signal-processing circuits 450 and 460, is performed. In step S14, the application of the first voltage XVf to the input terminals of the horizontal hall element hh10 through the circuit 456 of the first hall-element signal-processing circuit 450, is performed, so that the application of the second voltage YVf to the input terminals of the vertical hall element hv10 through the circuit 466 of the second hall-element signal-processing circuit 460, is performed. The first voltage XVf and the second voltage YVf are stored in the memory unit 72. The first voltage XVf and the second voltage YVf are read through the CPU 21 from the memory unit 72, when the photographing apparatus 1 is set to the on state.

In step S15, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal (pdx), and the second detected-position signal py, which is calculated by the hall-element signal-processing unit 45, is input to the A/D converter A/D 3 of the CPU 21 and is converted to a digital signal (pdy). Therefore, the present position of the movable unit 30a P (pdx, pdy) is determined.

In step S16, the values of the output signals from the D/A converters D/A 0 and D/A 1 are set to 0. Or, the application of voltage to the input terminals of the horizontal hall element hh10 and the vertical hall element hv10 is stopped. At the same time, the application of voltage to all operational amplifiers in the first and second hall-element signal-processing circuits 450 and 460 is stopped.

In step S17, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of the movement range of the movable unit 30a, in step S18. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S19.

In step S20, the driving force D, which drives the driver circuit 29 in order to move the movable unit 30a to the position S, in other words the first PWM duty dx and the second PWM duty dy, is calculated on the basis of the position S (sx, sy), which is determined in step S18 or step S19, and the present position P (pdx, pdy).

In step S21, the first driving coil unit 31a is driven by using the first PWM duty dx through the driver circuit 29, and the second driving coil unit 32a is driven by using the second PWM duty dy through the driver circuit 29, so that the movable unit 30a is moved.

The process in steps S20 and S21 is an automatic control calculation, which is used with the PID automatic control for performing general (normal) proportional, integral, and differential calculations.

In this embodiment, the first position-detecting and driving magnet 411b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the second position-detecting and driving magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second position-detecting and driving magnets 411b and 412b) are attached to the fixed unit 30b, however the hall element unit may be attached to the fixed unit and position-detecting magnets may be attached to the movable unit.

The magnet which generates a magnetic-field, may be a permanent magnet which always generates the magnetic-field, or an electric magnet which generates the magnetic-field when it is needed.

Further, it is explained that the movable unit 30a has the imaging device 39a1. However, the movable unit 30a may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, in this embodiment, the movable unit 30a is movable in the first direction x and the second direction y, relative to the fixed unit 30b, so that the position-detecting operation is performed by detecting the position of the movable unit in the first direction x (the first location), and in the second direction y (the second location). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the vertical hall element hv10 etc., may be omitted (see FIG. 3 etc.).

Further, in this embodiment, the position-detecting operation which is performed by detecting the change of the magnetic-field, is explained. However, a position-detecting operation which is performed by detecting an other change, is acceptable.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-063970 (filed on Mar. 8, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that can be moved in first and second directions, said first direction being perpendicular to an optical axis of a camera lens of said photographing apparatus, and said second direction being perpendicular to said optical axis and said first direction; and a fixed unit that slidably supports said movable unit in both said first and second directions;

one of said movable unit and said fixed unit having a magnetic-field change-detecting unit;

said magnetic-field change-detecting unit having a horizontal magnetic-field change-detecting element which is used for detecting a position of said movable unit in said first direction as a first location, and a vertical magnetic-field change-detecting element which is used for detecting a position of said movable unit in said second direction as a second location; and the application of voltage to input terminals of said horizontal magnetic-field change-detecting element and said vertical magnetic-field change-detecting element being performed during a position detecting operation of said movable unit, and being stopped at a time other than the time for said position detecting operation.

2. The anti-shake apparatus according to claim 1, further comprising:

a signal-processing unit; and a control unit that controls said movable unit, said fixed unit, and said signal-processing unit, and which has first and second A/D converters;

said signal-processing unit outputting a first detected-position signal, which specifies said first location on the basis of output signals of said horizontal magnetic-field change-detecting element, to said first A/D converter, and outputting a second detected-position signal, which specifies said second location on the basis of output signals of said vertical magnetic-field change-detecting element, to said second A/D converter;

said control unit calculating said first location on the basis of an A/D converting operation by said first A/D converter, for said first detected-position signal, and calculating said second location on the basis of an A/D converting operation by said second A/D converter, for said second detected-position signal; and said application of a first voltage to the input terminals of said horizontal magnetic-field change-detecting element and of a second voltage to the input terminals of said vertical magnetic-field change-detecting element, being performed and stopped by said control unit, through said signal-processing unit.

3. The anti-shake apparatus according to claim 2, wherein said signal-processing unit has operational amplifiers which are used for outputting said first and second detected-position signals;

application of voltage to all of said operational amplifiers is performed during a position detecting operation of said movable unit, and is stopped at a time other than the time for said position detecting operation.

4. The anti-shake apparatus according to claim 3, wherein when said position detecting operation is started, said application of voltage to all of said operational amplifiers is performed before said application of said first voltage to the input terminals of said horizontal magnetic-field change-detecting element and said second voltage to the input terminals of said vertical magnetic-field change-detecting element, is performed; and when the position detecting operation is finished, said application of voltage to all of said operational amplifiers, said application of said first voltage to the input terminals of said horizontal magnetic-field change-detecting element and of said second voltage to the input terminals of said vertical magnetic-field change-detecting element, is stopped at the same time.

5. The anti-shake apparatus according to claim 2, further comprising a memory unit that is connected with said control unit, and stores values of said first voltage and said second voltage; and a content which is stored in said memory unit is not deleted even if said memory unit is set to the off state.

6. The anti-shake apparatus according to claim 1, wherein said movable unit has said magnetic-field change-detecting unit;

said horizontal magnetic-field change-detecting element has one magnetic-field change-detecting element; and said vertical magnetic-field change-detecting element has one magnetic-field change-detecting element.

7. The anti-shake apparatus according to claim 6, wherein said magnetic-field change-detecting unit is a one-axis hall element; and said horizontal magnetic-field change-detecting element and said vertical magnetic-field change-detecting element are hall elements.

8. The anti-shake apparatus according to claim 6, wherein said fixed unit has a first position-detecting magnet which is used for detecting said first location and faces said horizontal magnetic-field change-detecting element, and has a second position-detecting magnet which is used for detecting said second location and faces said vertical magnetic-field change-detecting element.

9. The anti-shake apparatus according to claim 8, wherein said first position-detecting magnet is used for moving said movable unit in said first direction; and said second position-detecting magnet is used for moving said movable unit in said second direction.

* * * * *